(No Model.)

D. W. GROH.
DEVICE FOR ASSISTING VISION.

No. 459,563. Patented Sept. 15, 1891.

Witnesses:
Samuel W. Reese
Thomas F. Condon

Inventor:
Daniel W. Groh.

UNITED STATES PATENT OFFICE.

DANIEL W. GROH, OF BREATHEDSVILLE, MARYLAND.

DEVICE FOR ASSISTING VISION.

SPECIFICATION forming part of Letters Patent No. 459,563, dated September 15, 1891.

Application filed March 5, 1888. Serial No. 266,236. (No model.)

*To all whom it may concern:*

Be it known that I, DANIEL W. GROH, a citizen of the United States, residing at Breathedsville, in the county of Washington and State of Maryland, have invented certain new and useful Improvements in Eye-Pieces for Spectacles, Goggles, and other Optical Instruments, of which the following is a specification.

The object of my invention is to assist vision and prevent blurring, indistinctness, and confusion of eyesight by means of adjusted eye-holes or artificial pupils in an opaque eye-piece or attachment, which may be supported before the eye in a frame or otherwise, as are common spectacles, goggles, and other vision-assistants, thus artificially imitating and performing the duty of the ever expanding and contracting pupil in the natural eye in its effort to adjust itself to various degrees of light. I attain these objects by the mechanism illustrated in the accompanying drawings, in which—

Figure 1:
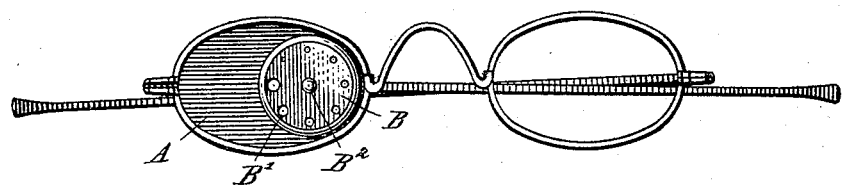
Figure 2:
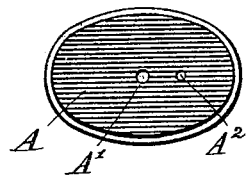
Figure 3:
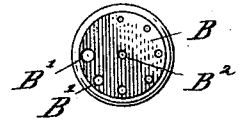

Figure 1 is a plane view of the entire instrument in a spectacle-frame; Fig. 2, a plane view of the eye-piece without either the attachment or the spectacle-frame, and Fig. 3 a plane view of merely the revolving disk-shaped attachment.

Similar letters refer to similar parts throughout the several views.

The letter A designates the plain opaque eye-piece, through which is the eye-hole A' and the rivet-hole A².

By means of the revolving disk-shaped attachment B, with its graduated eye-holes B' B', attached to the eye-piece A by a rivet or screw passing through the two corresponding rivet-holes A² and B², so as to revolve thereon, I secure a variety of sizes of eye-holes B' B', that can alternately be brought before the eye-hole A', thus allowing a selection of such size of eye-hole as best suits the vision, distance, light, and state of atmosphere. These eye-holes or artificial pupils A' and B' B', when of proper size and shape, admit to the eye only the direct or perpendicular rays of light from the object viewed, while the diffused, divergent, oblique, and scattered rays, which cause blurring, confusion, and indistinctness of vision, are cut off by the opaque walls of the eye-piece or artificial iris surrounding the eye-hole or artificial pupil. As in the natural human eye the pupil is perfectly round, so the perfectly-round eye-hole which this instrument secures gives better results than any other shape by cutting off all rays outside a common center and admitting to the retina only the central axis of rays, while at the same time furnishing that variety of size which is shown by the ever-changing size of the natural pupil to be necessary to perfect vision. It will be evident that similar results may be obtained by substituting transparent spots or tubes for the eye-holes, or by giving the eye-piece instead of the attachment the greater number of eye-holes, or by making the eye-piece or attachment of other form, shape, size, sections, or parts, especially if so arranged that by moving the parts or sections the eye-holes or pupils can be enlarged or contracted in size as the graduated, adjusted, interchangeable, and perfectly circular eye-hole or transparent spots, surrounded by opaque walls to cut off the oblique rays, in imitation of the expanding and contracting pupil in the natural eye, by whatsoever means obtained, accomplishes the desired result.

Now what I claim as my invention, and desire to secure by Letters Patent, is—

The combination of the opaque eye-piece A, having the central perforation A', and the opaque disk attachment B, pivoted at its center to the eye-piece and having the graduated circular holes B' B', substantially as described, and for the purpose specified.

DANIEL W. GROH.

Witnesses:
S. W. REESE,
T. F. CONDON.